United States Patent [19]
Haubs et al.

[11] Patent Number: 6,080,822
[45] Date of Patent: Jun. 27, 2000

[54] COPOLYMER FOR COMPATIBILIZING BLENDS

[75] Inventors: Michael Haubs, Bad Kreuznach; Arnold Schneller, Messel; Frank Böhme, Pesterwitz; Dennis Kappler; Doris Pospiech, both of Dresden, all of Germany

[73] Assignee: Ticona GmbH, Kelsterbach, Germany

[21] Appl. No.: 09/158,052

[22] Filed: Sep. 22, 1998

[30] Foreign Application Priority Data

Sep. 24, 1997 [DE] Germany ............... 197 42 057

[51] Int. Cl.$^7$ ............... C08L 67/00; C08G 75/00; C08G 75/14
[52] U.S. Cl. ............... 525/397; 525/88; 525/391; 525/392; 528/373; 528/374; 528/376
[58] Field of Search ............... 525/88, 391, 397, 525/392; 528/373, 374, 376

[56] References Cited

U.S. PATENT DOCUMENTS

| | | | |
|---|---|---|---|
| 4,929,665 | 5/1990 | Inoue et al. | 524/560 |
| 5,182,334 | 1/1993 | Chen, Sr. | 525/397 |

FOREIGN PATENT DOCUMENTS

| | | |
|---|---|---|
| 0044184 | 1/1982 | European Pat. Off. . |
| 0432561 | 6/1991 | European Pat. Off. . |
| 0732369 | 9/1996 | European Pat. Off. . |

OTHER PUBLICATIONS

Chemical Abstracts identified as XP00208876.

Polymer 40 (1999) pp. 357–364 by Gopakumar et al.

Journal of Applied Polymer Science 44 (1992) Feb. 25, No. 6, New York, USA.

*Primary Examiner*—Duc Truong
*Attorney, Agent, or Firm*—Frommer Lawerence & Haug LLP

[57] ABSTRACT

A copolymer comprising
a) a segment A with a number-average molar mass Mn of from 1000 to 20,000 g/mol, which has
  i) units 1, which have been derived from structures of the formula (I)

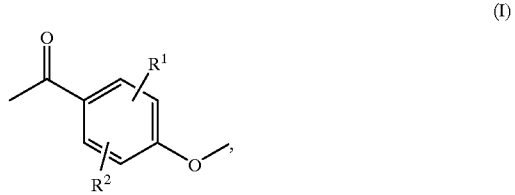

(I)

where the radicals $R^1$ and $R^2$, independently of one another, are a hydrogen, fluorine, chlorine or bromine atom or a branched or unbranched alkyl or alkoxy radical having from 1 to 6 carbon atoms; and/or
  ii) units 2, which are derived from structures of the formula (II)

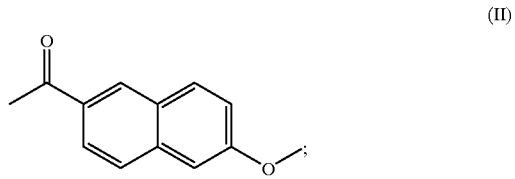

(II)

and
b) a segment B, derived from a polyarylene sulfide structure of the formula (IV)

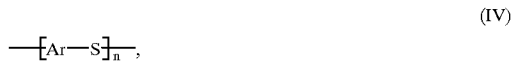

(IV)

where Ar is an aromatic radical, or more than one condensed aromatic radicals, and n is a number from 2 to 100, in particular from 5 to 20, together with a process for its preparation, and also its use for compatibilizing blends made from polyarylene sulfides and aromatic polyesters.

16 Claims, 2 Drawing Sheets

COPOLYMER FOR COMPATIBILIZING BLENDS

DESCRIPTION

The invention relates to the synthesis of copolymers from a polyarylene sulfide and an aromatic polyester, and also to their use for compatibilizing blends, in particular blends of polyarylene sulfides and liquid-crystalline polyesters.

Polyphenylene sulfide (PPS, for example Fortron®) and liquid-crystalline polyesters (Vectra®) (registered trademarks of Hoechst) are high-performance polymers with a wide variety of applications in industry. They can withstand high thermal, chemical and mechanical stresses.

A particular feature of the liquid-crystalline material Vectra® is its anisotropic structure. This makes the polymer capable of accepting severe mechanical loads in the longitudinal direction of its chains. In addition, the very good flowability of Vectra® makes it suitable for precision injection molding. A disadvantage is the high costs of production.

Particular features of PPS (Fortron®) are its chemical and thermal resistance, its low thermal and electrical conductivity and its low melt viscosity. Another advantage is its price, which for a high-performance polymer is comparatively low.

Mixtures of high-performance polymers with other heat-resistant polymers are known. Mixtures of PPS with Vectra® are also known. An advantage of such mixtures is that anisotropy, undesirable in some applications, of the liquid-crystalline polymer is avoided. A mixture of Vectra® and PPS moreover less costly than pure Vectra®.

Examples of such mixtures of PPS and Vectra® are well known from the literature. G. D. Choi, W. H. Jo and H. G. Kim in J. Appl. Polym. Sci. 59, 443–452, 1996, for example, describe the rheological, morphological and mechanical properties of these blends. However, this publication also indicates incompatibility of the two phases.

It has moreover been established that simple mixing of the polymers requires that other serious disadvantages be accepted. For example, the impact strength of Vectra® is lowered very severely when PPS is admixed.

It is known that the mechanical properties of the known PPS/Vectra®-blends can be improved by compatibilization, mostly by adding specific compatibilizing components.

For example, U.S. Pat. No. 5,182,334 describes the compatibilization of PPS/Vectra® A910 blends via direct esterification with boric acid/phosphoric acid as catalyst. In this case, carboxylic-acid-terminated polyesters and thiol-terminated PPS are extruded in the presence of a catalyst.

Another method of physical compatibilization has been described by B. C. Kim, T. W. Son, S. M. Hong and K. U. Kim in Polym. Prep. (Am. Chem. Soc., Div. Polym. Chem) 34, 823–24, 1993, where polysulfone (Udel® P-1700) is introduced into the PPS/Vectra® B950 blend system. The polysulfone is an amorphous polymer which acts as a compatibilizer in the PPSNectra® blend.

However, these two methods for compatibilizing PPS/Vectra® blends have the disadvantage that the mechanical properties are not significantly improved.

It is an object of the present invention to provide a suitable copolymer which is capable of compatibilizing PPS/Vectra® blends.

Figure 1:
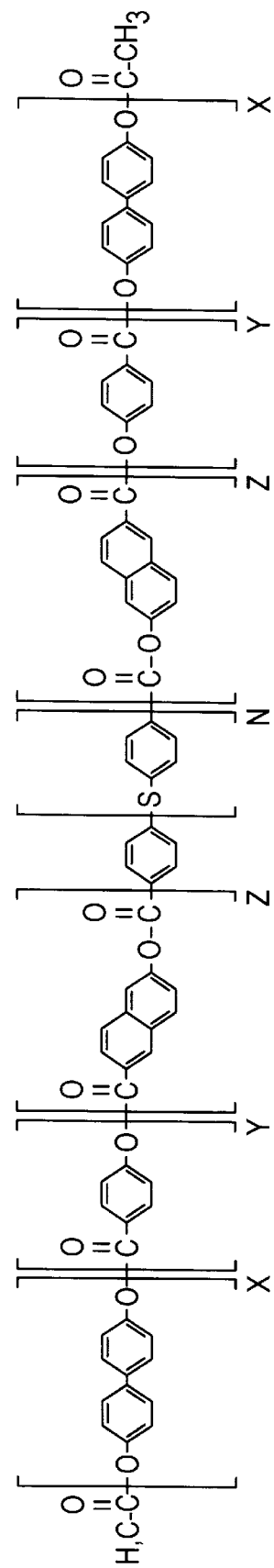
FIG. 1 is a structural formula which depicts a copolymer which was prepared from carboxylic acid and acetoxy-terminated oligomers, where n, x, y and z are respectively the number of units present.

The object is achieved by means of a copolymer, comprising:

a) a segment A with a number-average molar mass Mn of from 1000 to 20,000 g/mol, which has
i) units 1, which have been derived from structures of the formula (I)

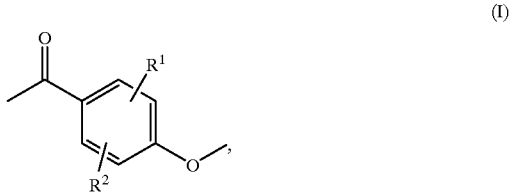

where the radicals $R^1$ and $R^2$, independently of one another, are a hydrogen, fluorine, chlorine or bromine atom or a branched or unbranched alkyl or alkoxy radical having from 1 to 6 carbon atoms; and/or ii) units 2, which are derived from structures of the formula (II)

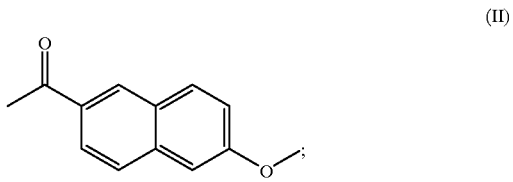

and b) a segment B, derived from a polyarylene sulfide structure of the formula (IV)

where Ar is an aromatic radical, or more than one condensed aromatic radical, and n is a number from 2 to 100, in particular from 5 to 20.

The unit 1 is p-hydroxybenzoic acid or one of its derivatives, and unit 2 is composed of 2-hydroxynaphthalene-6-carboxylic acid.

The radical Ar in formula (IV) can be a phenylene or naphthylene radical. In a particularly preferred embodiment of the present invention, the segment B has been derived from poly(m-thiophenylene) or poly(o-thiophenylene), and in particular from poly(p-thiophenylene) (PPS).

The number-average molar mass Mn of the copolymer may be from 3000 to 3,000,000 g/mol, preferably from 5000 to 200,000 g/mol, in particular from 10,000 to 100,000 g/mol.

In a particular embodiment of the invention, the segment A of the copolymer has both units 1 and units 2.

These units 1 and 2 may be arranged with random distribution or in alternating sequence in the segment A. In relation to the definition of "random distribution" or "alternating sequence" reference may be made to H. G. Elias, "Makromoleküle" [Macromolecules] Vol. 1, Hüthig & Wepf Verlag Basel 1990, pp. 32–34.

The molar ratio of units 1 to units 2 in the segment A of the novel copolymers may be from 1:9 to 9:1.

In another embodiment of the invention, the segment A of the copolymer also has from 0.5 to 10 mol % of units 3 which have been derived from structures of the formula (III)

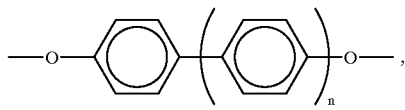

(III)

where n is the number 0 or 1. Such units 3 are derived from either from hydroquinone (n=0) or 4,4'-dihydroxydiphenyl (n=1). This unit 3 has the function of a chain regulator. Depending on the amount of unit 3 incorporated, block A has an average molar mass, expressed as number average Mn, of from about 1000 to 20,000 g/mol, preferably from 2000 to 10,000 g/mol.

The proportion of segment A in the novel copolymers described above may be from 5 to 95% by weight. The respective segments A and B may form either a block copolymer or a copolymer corresponding to the structure (I)

—ABABAB— (Structure I)

in which the segments A and B are arranged so that they alternate, or a copolymer with the fixed sequence of segments A—B—A (Structure II).

In the latter case, the segment A of this specific tri-block copolymer does not comprise any of unit 3.

The segments A and B in the novel copolymers are preferably linked with one another via ester bridges in the following manner: A—O—CO—B.

The novel copolymers may be prepared by various processes, e.g. by condensation and/or transesterification of the acetoxy-group-terminated oligo(4-oxybenzoate-co-2,6-oxynaphthoate) derived from the segment A with carboxyl-group-terminated PPS oligomers derived from the segment B. Alternatively, it is possible to react the reactive derivatives of the carboxyl-group-terminated PPS oligomers, such as the corresponding aryl or acyl esters, with the corresponding hydroxyl-group-terminated oligo(4-oxybenzoate-co-2,6-oxynaphthoates).

Carboxyl-group-terminated PPS oligomers may be synthesized by methods similar to those in a specification by Heitz (Freund, L.; Heitz, W. *Makromol. Chem.* 191, 815–828, 1990), by reacting p-dichlorobenzene and/or m-dichlorobenzene with sodium sulfide trihydrate and subsequently with p-chlorobenzoic acid. The reaction is carried out in a polar solvent, such as N-methylpyrrolidone or N-methylcaprolactam, at temperatures of from 220 to 270° C. and pressures of from 8 to 12 bar in an autoclave. In this version of the preparation, the conversions achieved are around 95% after a reaction time of from 8 to 12 hours.

The molar masses Mn of the functionalized PPS oligomers are in the range from 500 to 20,000 g/mol and are adjusted by selection of the appropriate concentration ratio of the starting materials.

Acetyoxy-terminated oligo(4-oxybenzoate-co-2,6-oxynaphthoates) are prepared by condensation and/or transesterification of the acetoxycarboxylic acids derived from the units 1 and 2 and of the diacetoxy compounds derived from unit 3, followed by polycondensation. Both the acetoxycarboxylic acids and the diacetoxy compound may be prepared in situ from the hydroxycarboxylic acids derivable from the formulae 1 and 2 and from the dihydroxy compound derivable from the formula 3. The diacetoxy and/or dihydroxy compounds derived from the formula 3 have the function of a molar mass regulator and are used in a proportion of from 0 to 10 mol %.

The polymer which is produced without addition of the molar mass regulator is terminated at one chain end with a carboxyl group and at the other chain end with an acetoxy group. This polymer is used in the synthesis of block copolymers of type (II). The polymer produced with addition of the molar mass regulator is terminated at both ends with acetoxy groups. This polymer is used in the synthesis of block copolymers of type (I).

The synthesis of the novel copolymers is preferably carried out by melting together of the carboxyl-group-terminated PPS oligomer and the acetoxy-terminated oligo (4-oxybenzoate-co-2,6-oxynaphthoate). The chain is built up via transesterification reactions and elimination of acetic acid. Use of an oligo(4-oxybenzoate-co-2,6-oxynaphthoate) which is acetoxy-terminated at both ends gives multi-block copolymers of the structure (I), while the use of an oligo(4-oxybenzoate-co-2,6-oxynaphthoate) which is acetoxy-terminated at one end and carboxylic-acid-terminated at the other end gives tri-block copolymers of the structure (II).

The condensation and transesterification reactions, like the polymerization reactions, may be accelerated by using suitable catalysts. Examples of such catalysts are magnesium, titanium tetraisopropylate, magnesium acetate, potassium acetate, cobalt acetate, alkoxytitanates, dibutyltin dilaurate and germanium dioxide. The catalysts are preferably used in amounts of from 0.001 to 2%, based on the total weight of the starting compounds.

The novel copolymers are prepared at temperatures of from 250 to 400° C. preferably from 280 to 350° C. It is generally advantageous to accelerate the polymerization reactions by applying reduced pressure.

Depending on the degree of polymerization and composition, the melt temperatures of the copolymers are in the range from 250 to 380° C. preferably from 280 to 340° C.

The preparation of a novel copolymer is described below:

The copolymer is prepared from a functionalized PPS oligomer and a functionalized oligo(4-oxybenzoate-co-2,6-oxynaphthoate). A chain regulator (unit 3) may be used here for controlled adjustment of the molar mass of the liquid-crystalline polyester. A possible structural formula for the copolymer which was prepared from carboxylic acid- and acetoxy-terminated oligomers is given in FIG. 1, where n, x, y and z are respectively the numbers of units present.

Diphenyl diacetate (DPDA) was used here as chain regulator in the synthesis of the liquid-crystalline polyester.

The synthesis of the copolymer is advantageously carried out in a melt kneader. For copolymers of high molar mass, the functionalized blocks A and B are used in equimolar amounts. If copolymers of a low degree of polymerization are desired, this is achieved via the stoichiometry of the starting compounds. The melt polycondensation is carried out at a temperature of from 280 to 360° C. and at reduced pressure, over a period of from 0.1 to 8 hours. The progress of the reaction may be followed via the increase in torque.

The novel copolymer may be used in particular for compatibilizing blends of a polyarylene sulfide and a liquid-crystalline polyester.

In this connection, for example, the commercially available products Vectra® and Fortron® are mixed with the copolymer in the melt to give a compatibilized PPS/Vectra® blend. The weight ratios of Vectra® and Fortron® here may vary from 1:9 to 9:1. The proportion of the synthetic copolymer in this mixture is from 0.5 to 15% by weight, preferably from 1 to 5% by weight. The compatibilized blend preferably comprises at least 50% by weight of polyarylene sulfide.

Figure 2:
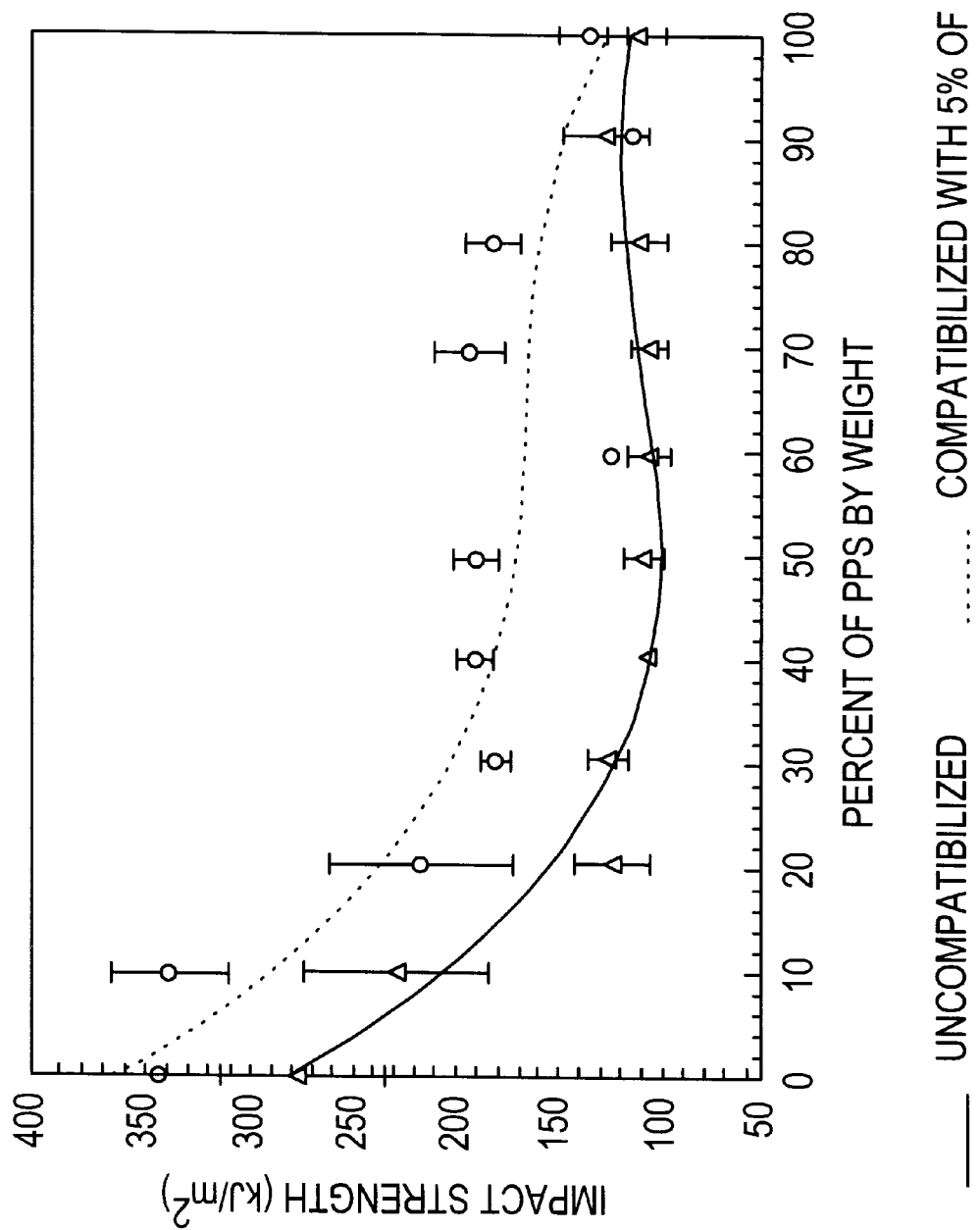
FIG. 2 is a graph which depicts the impact strength of non-compatibilized and compatibilized blends as different percentages of PPS by weight.

As shown in FIG. 2, the blends compatibilized with the novel copolymers have markedly increased impact strengths over the entire range of concentration. Quite unexpectedly, moreover, impact strength is also markedly increased when the novel copolymer is added to pure Vectra®. The compatibilizing effect of the copolymer can be rendered visible by means of scanning electron microscope images. In the compatibilized blend it is possible to discern significantly smaller domains with phase boundaries which are rougher.

In individual cases a doubling of impact strength is achieved in these blends without any change in their other mechanical properties.

The morphology of the compatibilized blend has marked, rougher phase boundaries and smaller domains. This explains the compatibilizing effect of the copolymers.

The following examples serve to illustrate the invention.

EXAMPLE 1 (comparative example)

To prepare the non-compatibilized blend PPS (Fortron®) and Vectra® A950 are kneaded in a Brabender Plasticorder at 300° C. at a rotation rate of 80 min$^{-1}$, in the composition given in Table 1 (Blend 0 to Blend 10). The blend is substantially homogenized after a kneading time of 15 minutes.

EXAMPLE 2 a) Preparation of Segment A:

The liquid-crystalline polyester (segment A) is prepared in a 500 ml three-necked flask with stirrer, $N_2$ gas supply and reflux condenser. The starting materials charged to the flask are p-hydroxybenzoic acid and 2,6-hydroxynaphthoic acid in an equimolar ratio, 5 mol % of diphenyl diacetate (DPDA) as molar mass regulator and a 10% excess of acetic anhydride based on the hydroxyl groups. The reaction mixture is then evacuated three times and on each occasion flushed with nitrogen. The reaction starts when the glass flask is immersed in a metal bath. The reaction mixture is stirred for two hours at 140° C. the boiling point of the acetic anhydride, while flushing with $N_2$. This dissolves the starting materials. The reaction mixture is clear and yellow. The temperature is then raised slowly to 260° C. within a period of one hour, during which acetic acid and the excess of acetic anhydride are distilled off. The residue is a pale yellow melt. After a further hour, the condensation is continued under reduced pressure for two hours. Half an hour before the end of the reaction, the temperature is raised to 280° C. The melt, which is initially slightly yellowish, slowly assumes a pale shade of gold.

b) Preparation of the Segment B:

Polyphenylene sulfide with carboxylic acid end groups (segment B) is prepared in a 2 l titanium autoclave. The starting materials used are 1 mol of p-dichlorobenzene and 1.05 mol of sodium sulfide trihydrate, and the solvent used is 1.2 l of N-methylpyrrolidone. At the start of the reaction, the autoclave is flushed for half an hour with nitrogen in order to remove residues of oxygen. During the reaction time of six hours, with stirring and a reaction temperature of 250° C. the pressure rises to from 8 to 10 bar. After the first step of build-up of the chain, the PPS oligomer in the cooled autoclave is reacted with 0.15 mol of p-chlorobenzoic acid to modify the end groups and 5 mmol of triphenylphosphine to reduce the disulfide bonds. The reaction is carried out for a further four hours under inert gas with the same reaction conditions, giving a pressure of from 10 to 12 bar. After cooling the autoclave, its contents are poured into 2 l of a mixture of 50% concentrated hydrochloric acid and ice. The resultant product precipitates as a voluminous white powder in a yellowish solution. The product is washed with two liters of distilled water and two liters of methanol. After filtering off the solid, the oligomer is dried for eight hours at 120° C. in a vacuum drying cabinet. The yield of this reaction is 92.5%.

c) Preparation of the Novel Copolymer:

To synthesize the copolymer, the segments A (carboxylic-acid-terminated PPS prepared in accordance with Example 2a) and the segments B (acetoxy-terminated poly(4-oxybenzoate-co-2,6-oxynaphthoate) prepared in accordance with Example 2b) are kneaded in a Brabender Plasticorder at a temperature of 300° C. for a period of three hours. Both oligomers have a molar mass Mn of 2500 g/mol and are used in equimolar quantities. The condensation reaction is promoted by applying reduced pressure. In the first 45 minutes no change in torque is observable. During the course of the remaining reaction time of 135 minutes the torque rises continuously from 0 to, on average, 4 Nm. The conversion in the reaction is determined via the amount of condensed acetic acid and after three hours is virtually 100%.

d) Preparation of the Compatibilized Blend:

To prepare the compatibilized blend, PPS (Fortron®) and Vectra® A950 are mixed in a Brabender Plasticorder at 300° C. in the composition of Table 1 (Blend 11 to Blend 21). The data in % by weight are relative and relate only to the mixture of the blend components PPS (Fortron®) and Vectra® A950. After the blend components have melted completely, 5% by weight of the compatibilized copolymer of Example 2c), based on the non-compatibilized blend, are added. A kneading time of 15 minutes gives the compatibilized blend.

The mechanical tests were undertaken on injection moldings (S2 specimen of type 53504) in accordance with the DIN 53448 specification using a Psd 50/15 pendulum impact tester.

TABLE 1

Compositions and impact strengths of the blends

| | | Example 1 (comp.) | | Example 2 | |
|---|---|---|---|---|---|
| (Fortron ®) [% by wt.] | Vectra ® A950 [% by wt.] | Blend | Blend impact strength [kJ/m$^2$] | Blend | Blend impact strength [KJ/m$^2$] |
| 0 | 100 | Blend 0 | 274.8 | Blend 11 | 342.9 |
| 10 | 90 | Blend 1 | 228.7 | Blend 12 | 338.0 |
| 20 | 80 | Blend 2 | 123.3 | Blend 13 | 216.0 |
| 30 | 70 | Blend 3 | 125.7 | Blend 14 | 180.2 |
| 40 | 60 | Blend 4 | 108.3 | Blend 15 | 189.0 |
| 50 | 50 | Blend 5 | 107.3 | Blend 16 | 188.0 |
| 60 | 40 | Blend 6 | 103.5 | Blend 17 | 122.9 |
| 70 | 30 | Blend 7 | 102.1 | Blend 18 | 189.0 |
| 80 | 20 | Blend 8 | 106.2 | Blend 19 | 177.1 |
| 90 | 10 | Blend 9 | 109.1 | Blend 20 | 122.3 |
| 100 | 0 | Blend 10 | 108.2 | Blend 21 | 129.1 |

We claim:

1. A copolymer comprising
   a) a segment A with a number-average molar mass Mn of from 1000 to 20,000 g/mol, which has
      i) units 1, which have been derived from structures of the formula (I)

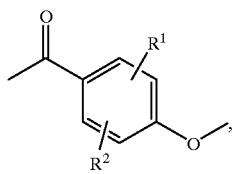

(I)

where the radicals $R^1$ and $R^2$, independently of one another, are a hydrogen, fluorine, chlorine or bromine atom or a branched or unbranched alkyl or alkoxy radical having from 1 to 6 carbon atoms; and/or ii) units 2, which are derived from structures of the formula (II)

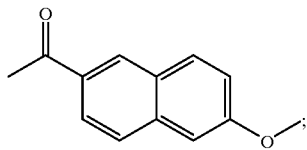

(II)

and b) a segment B, derived from a polyarylene sulfide structure of the formula (IV)

(IV)

where Ar is an aromatic radical, or more than one condensed aromatic radicals, and n is a number from 2 to 100, in particular from 5 to 20.

2. A copolymer as claimed in claim 1, wherein Ar is a phenylene or naphthylene radical.

3. A copolymer as claimed in claim 1, wherein the segment B has been derived from poly(m-thiophenylene) or poly(o-thiophenylene), and in particular from poly(p-thiophenylene).

4. A copolymer as claimed in claim 1, wherein the number-average molar mass Mn is from 2000 to 10,000 g/mol.

5. A copolymer as claimed in claim 1, wherein the segment A has both units 1 and units 2.

6. A copolymer as claimed in claim 1, wherein the units 1 and 2 in the segment A are arranged with random distribution.

7. A copolymer as claimed in claim 1, wherein the units 1 and 2 in the segment A are arranged in alternating sequence.

8. A copolymer as claimed in claim 1, wherein the molar ratio of units 1 to units 2 in the segment A is from 1:9 to 9:1.

9. A copolymer as claimed in claim 1, wherein the segment A also has from 0.5 to 10 mol % of units 3, which have been derived from structures of the formula (III)

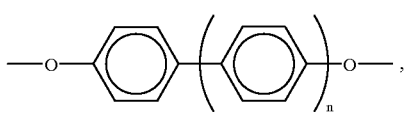

(III)

where n is the number 0 or 1.

10. A copolymer as claimed in claim 1, wherein the proportion of segment A is from 5 to 95% by weight.

11. A copolymer as claimed in claim 1, wherein the segments A and B form a block copolymer.

12. A copolymer as claimed in claim 1, wherein the segments A and B are arranged so that they alternate.

13. A copolymer as claimed in claim 1, and composed of the fixed sequence of segments A—B—A.

14. A process for preparing a copolymer as claimed in claim 1, which comprises allowing an acetoxy-group-terminated segment A and a carboxyl-group-terminated segment B to react with one another in the melt.

15. A process of utilizing a copolymer as claimed in claim 1, which comprises compatibilizing blends made from a polyarylene sulfide and a liquid-crystalline polyester.

16. A process as claimed in claim 15, which comprises compatibilizing blends of at least 50% by weight of polyarylene sulfide.

* * * * *